United States Patent [19]

Catlin et al.

[11] Patent Number: 4,607,378

[45] Date of Patent: Aug. 19, 1986

[54] DETECTOR FOR DETECTING SYNC BITS IN A STREAM OF DATA BITS

[75] Inventors: Gary M. Catlin, Brick, N.J.; Michael P. Healy, Fairfax, Va.

[73] Assignee: Honeywell Inc., Minneapolis, Minn.

[21] Appl. No.: 663,513

[22] Filed: Oct. 22, 1984

[51] Int. Cl.⁴ .............................................. H04L 7/00
[52] U.S. Cl. .................................................. 375/116
[58] Field of Search ....................... 375/114, 115, 116; 370/100, 105, 107

[56] References Cited

U.S. PATENT DOCUMENTS

| | | | |
|---|---|---|---|
| 3,586,776 | 6/1971 | Salava | 375/116 |
| 3,766,316 | 10/1973 | Hoffman et al. | 375/116 |
| 4,404,675 | 9/1983 | Karchevski | 375/116 |
| 4,450,558 | 5/1984 | Hampton et al. | 375/116 |

Primary Examiner—Marc E. Bookbinder
Attorney, Agent, or Firm—R. W. Jensen

[57] ABSTRACT

A detector for detecting a valid synchronizing pattern in a data frame in which a synchronizing bit pattern is multiplexed including a first register to receive the data and the synchronization bits, a pattern detector connected to the first register for detecting the synchronizing bit pattern in the first register, a second register, a source of clock pulses coupled to both said first and second registers, the elements of the second register being set to a first binary state and a density detector coupled to the second register. The clock source changes the states of successive elements of the second register from the first binary state to a second binary state as the data and synchronization bits are moved through the first register, the second register having inserted therein a signal of the first binary state upon the simultaneous detection of the synchronizing bit pattern and the conversion of a last element of said second register from a second binary state to a first binary state, and means responsive to the density detector detecting a predetermined number of elements of said second register in said first binary state to establish synchronization.

2 Claims, 1 Drawing Figure

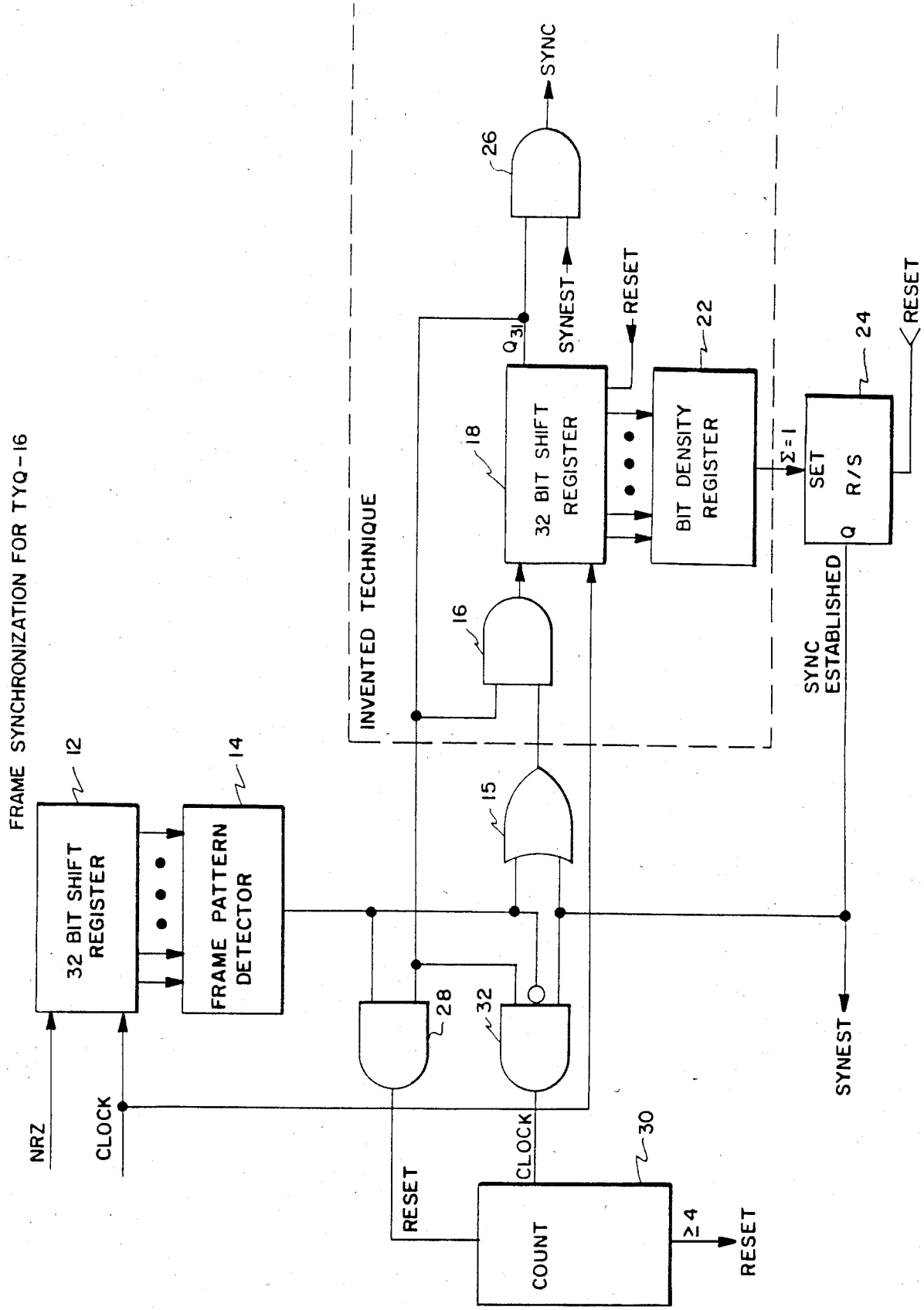

4,607,378

DETECTOR FOR DETECTING SYNC BITS IN A STREAM OF DATA BITS

BACKGROUND OF THE INVENTION

This invention relates to an improved scheme for detecting a synchronizing bit pattern in a data bit stream, and more particularly to an elegant detection scheme for quickly distinguishing between a synchronizing pattern and apparent synchronizing patterns of data bits.

In the systems to which this invention is applicable, a transmitter sends a stream of binary data bits to which it periodically adds synchronizing or framing code bits in a predetermined pattern. The synchronizing bit pattern is repeated in each data frame so that within a data block or frame the code is continuously repetitive at the framing bit locations.

It will be appreciated that data bits will be also transmitted, from time to time, in a sequence or pattern identical to the synchronizing or framing code pattern. The location of the true framing code pattern can be identified by eliminating locations in the data block that do not continuously contain the synchronizing code pattern.

A simple serial search scheme for frame synchronization has been effectively used in many prior art systems. Basically, this method operates as follows:

assume the first bit received begins a frame;

when the candidate frame is received, test the contents of the frame bit locations to see if they contain the designated frame code; and if so, wait for the next frame, check again, and keep track of the number of times this is repeated, ending with a declaration of synchronization after a specified number of correct detections (based upon error probability levels) has been attained; or if a false code is encountered, slip by one bit, and then check the next candidate frame as described above.

This technique is effective, but the expected number of frames requiring examination prior to location of the proper synchronization point is relatively high.

SUMMARY OF THE INVENTION

The object of this invention is the provision of a simple system for detecting and establishing synchronization in as short of time as possible.

Briefly, in accordance with this invention, each additional bit received after the first full frame of bits is considered to complete another frame whose appropriate bit locations are checked for the proper framing bit pattern. After two full frame lengths of bits have been received, all possible framing alignments have been checked one time. All correctly coded alignments have been recorded. As each additional bit is received, the framing bit locations are continuously checked. Those candidate locations which have unfailingly exhibited the proper code are identified. When only one such location in the data frame exists, it is declared to be the frame synchronization pattern.

BRIEF DESCRIPTION OF THE DRAWINGS

A better understanding of the present invention may be had when the following detailed description is read in connection with the accompanying drawing, in which; The FIGURE is a block diagram of a serial data frame detection and synchronization circuit in accordance with the teachings of this invention.

DESCRIPTION OF THE PREFERRED EMBODIMENT

Referring now to the FIGURE, a transmitter (not shown) transmits a serial stream of data bits into which is multiplexed the framing or synchronization bit pattern. This data stream, which may be a non return to zero (NRZ) data stream, serves as input to a shift register 12. The length of the shift register 12 is equal to the length of the data frame or block—for example 32 bits. The transmitter repetitively inserts the framing pattern at the same location in the data block or frame.

A frame pattern detector 14 is coupled to the shift register 12. It provides a logical "1" output when the sync bit pattern appears at the predetermined location in the 32 bit shift register.

The output of the frame pattern detector 14 is coupled via an OR gate 15 as one input to AND gate 16, the other input of which is coupled to the output of a shift register 18. The function of gate 16 is to insert a logical "1" to the input of the shift register 18 whose length is equal in length to the data block; e.g., 32 bits—each time a framing pattern is detected and there is a logical "1" output from register 18.

A reset signal initially sets the register 18 to all "1's". A bit density register 22 examines the content of shift register 18 and provides a output to a flip-flop 24 when the contents of register 18 contain a single logical "1". Setting of flip-flop 24 signals the establishment of synchronization.

In operation, the register 18 is, as pointed out above, initially set to all "1's". As the transmitted data bits are received they are shifted successively through the register 12. Each time the frame pattern detector 14 detects a bit pattern which is the same as the synchronization bit pattern at the predetermined locations in the data frame in shift register 12, it provides a logical "1" as an input to gate 16. A clock pulse advances the register 18 in synchronism with the advance of data pulses through register 12. When a sync pattern is first detected, gate 16 has as inputs a logical "1" from detector 14, and a logical "1" from the output of register 18. In response to both inputs at "1", gate 16 inserts a "1" into register 18. In the absence of the insertion of a "1" by gate 16, each clock pulse sets successive stages of the register to logical "0".

Upon receipt of each successive input data bit into the register 12, the content of the register is checked by the pattern detector 14 for the presence of the synchronization pattern in the predetermined location within the register 12. Thus, in the next data block, detector 14 detects the sync pattern and its output will be ANDed with a binary "1" output from the register 18 inserted from the previous detection. When only a single non zero bit remains in register 18 the bit density register 22 sets flip-flop 24 signaling the establishment of synchronization. An AND gate 26 provides the sync output pulse.

The declaration of correct synchronization is completed when all non-valid candidate locations have exhibited incorrect coding at least once. The time necessary for the required sequence of bits to be received is the minimum period necessary for synchronization detection. The serial search technique described previously cannot be expected to attain this minimum period. Other techniques using microprocessor or special signal processing integrated circuits can be used to attain the minimum period, however, they do so by operating at clock speeds man time higher than the data rate.

A counter 30 in combination with gates 28 and 32, reset register 18 in the event a validity of the sync pattern has not been established.

Thus, the objects of the invention have been accomplished. This constraint places a limitation on the highest data rates which can be processed without parallel architectures. The speed of the technique disclosed herein is limited only by the gate propagation delays.

What is claimed is:

1. A detector for detecting a valid sychronizing pattern in a data frame in which a sychronizing bit pattern is multiplexed and thereby establishing synchronization; comprising in combination:

a first register receiving data and synchronization bits of said data frame;

a pattern detector coupled to said first register for detecting said synchronizing bit pattern in said first register;

a second register;

a source of clock pulses coupled to both said first and second registers;

means for setting all elements of said second register to a first binary state;

a density detector coupled to said second register;

said clock source changing the states of successive elements of said second register from said first binary state to a second binary state as said data and synchronization bits are moved through said first register;

means for inserting in said second register a signal of said first binary state upon the simultaneous detection of said synchronizing bit pattern and the conversion of a last element of said second register from a second binary state first to said first binary state; and means responsive to said density detector detecting a predetermined number of elements of said second register in said first binary state to establish synchronization.

2. A detector for detecting a valid synchronizing pattern in a data frame in which a synchronizing bit pattern is multiplexed and thereby establishing synchronization as in claim 1 wherein said first register and said second register are each equal in length to the data frame.

* * * * *